United States Patent [19]

Butler

[11] 4,226,330

[45] Oct. 7, 1980

[54] RUPTURE LINES IN FLEXIBLE PACKAGES

[76] Inventor: Robert W. Butler, 912 N. Colorado, Ulysses, Kans. 67880

[21] Appl. No.: 738,164

[22] Filed: Nov. 1, 1976

Related U.S. Application Data

[63] Continuation of Ser. No. 578,132, May 16, 1975, abandoned.

[51] Int. Cl.³ .................... B65D 33/36; B65D 77/30; B65D 25/08
[52] U.S. Cl. .................................. 206/620; 206/219
[58] Field of Search ............... 206/498, 531, 532, 264, 206/219, 222, 620; 220/266; 229/DIG. 4, 48 T, 56, 66; 426/122, 124, 109, 112, 115, 119, 120, 121; 150/8

[56] References Cited

U.S. PATENT DOCUMENTS

| | | | |
|---|---|---|---|
| 758,672 | 5/1904 | Mayall | 229/DIG. 4 |
| 2,687,130 | 8/1954 | Cohen | 128/272 |
| 2,899,318 | 8/1959 | Long | 206/219 |
| 3,186,628 | 6/1965 | Rohoe | 206/498 |
| 3,255,872 | 6/1966 | Long et al. | 206/498 |
| 3,331,499 | 7/1967 | Jost | 206/498 |
| 3,342,324 | 9/1967 | Piazze | 206/498 |
| 3,674,134 | 7/1972 | Turner | 206/498 |
| 3,788,374 | 1/1974 | Saijo | 150/8 |
| 3,907,193 | 9/1975 | Heller | 229/DIG. 4 |
| 3,950,158 | 4/1976 | Gossett | 206/219 |

FOREIGN PATENT DOCUMENTS

| | | | |
|---|---|---|---|
| 206210 | 12/1956 | Australia | 206/219 |
| 1248882 | 11/1960 | France | 206/219 |

Primary Examiner—Stephen P. Garbe
Attorney, Agent, or Firm—Fishburn, Gold and Litman

[57] ABSTRACT

Method and apparatus for producing rupturable areas in thermoplastic film wherein said film is used to make closed flexible containers or packages that are easily ruptured for the release of contents contained therein. The apparatus is comprised of a male mold portion and a female mold portion having the film interposed therebetween. Application of heat and pressure to the film by the male and female mold portions cause the plastic film to extrude outwardly from the impression area thereby forming a weakened line or area in the film by selectively reducing the thickness thereof. The film is then formed into flexible packages having the rupture area in a selected position.

4 Claims, 10 Drawing Figures

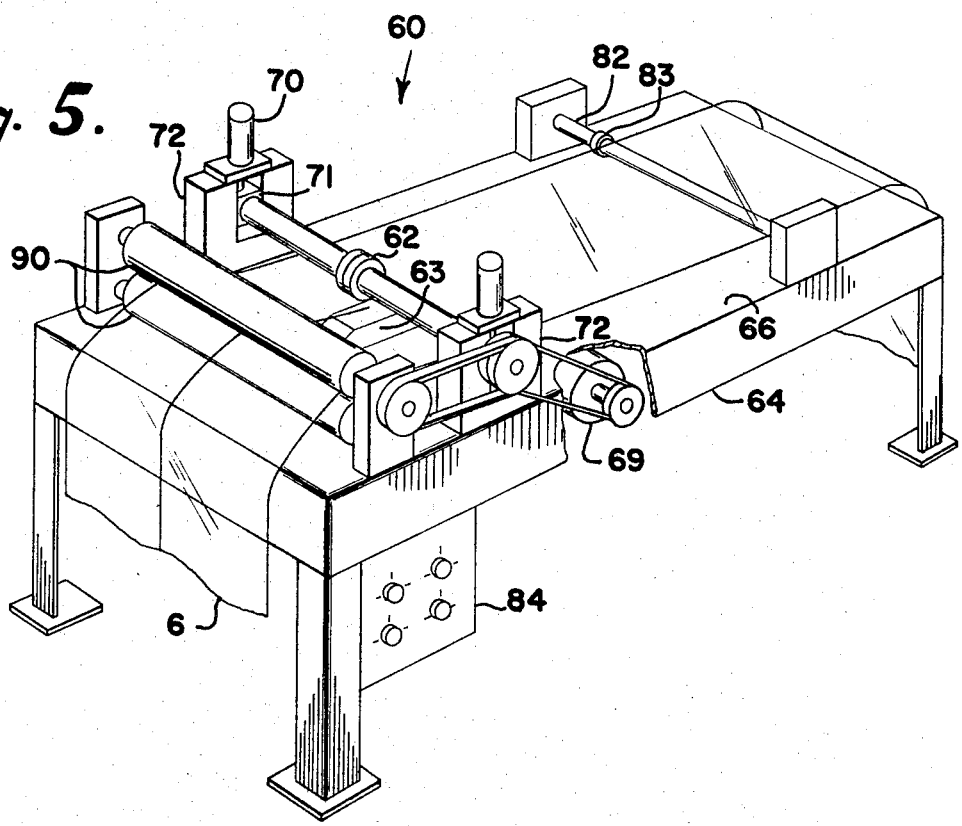
Fig. 5.
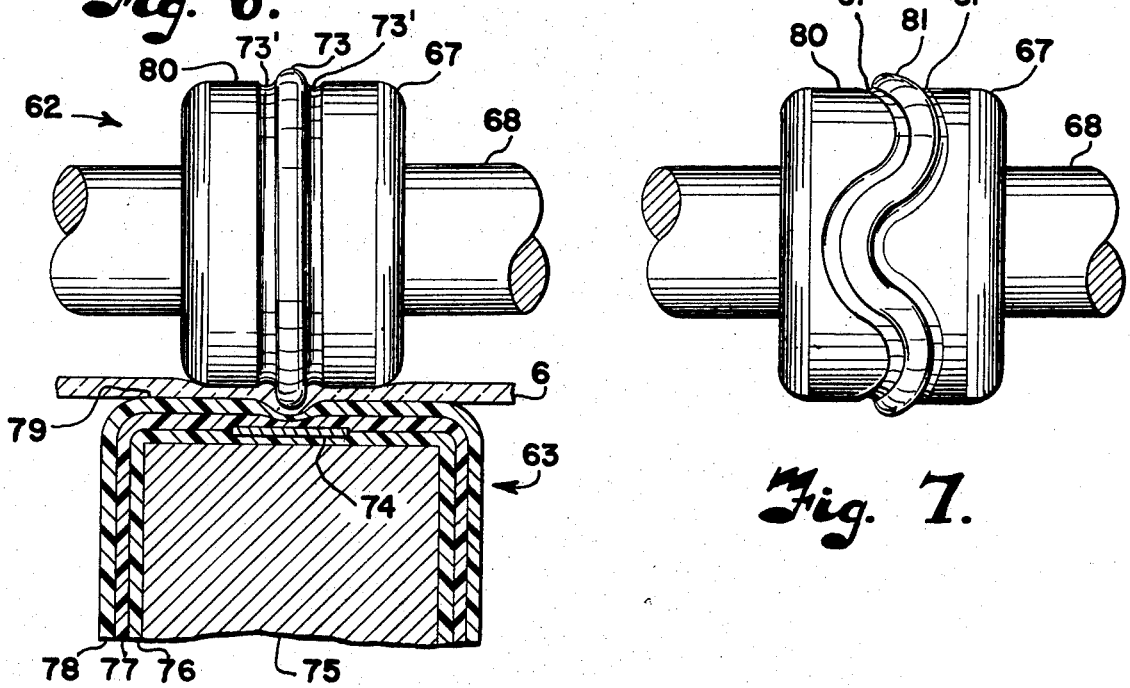
Fig. 6.
Fig. 7.

RUPTURE LINES IN FLEXIBLE PACKAGES

This is a continuation of application Ser. No. 578,132, filed May 16, 1975, now abandoned.

The present invention relates to apparatus and method for producing controlled rupturable areas in thermoplastic film that is used in the manufacture of closed flexible containers or packages. Attempts have been made in the past to produce rupturable containers particularly multi-compartment rupturable containers wherein one container is enclosed in another container for separating materials that are to be mixed at a later time. Difficulties have been encountered with rupturable containers, for example inability to rupture the inner container without rupturing the outer container; the requirement of excessive force to rupture the inner container; not having the inner container rupture in the proper place; and inability to make rupturable containers from non-heat sealable materials such as Mylar. Typical of rupturable containers that have been produced are the type designed to rupture along a heat sealed portion of an inner container and wherein this is little control over the amount of rupture force necessary and little selection of the rupture line position.

The principal objects of the present invention are: to provide a method and apparatus for producing rupturable areas in thermoplastic film wherein the film can be formed into flexible rupturable packages that overcome the above mentioned difficulties; to provide such a method and apparatus wherein the product or packages produced from the film have rupturable areas with predetermined rupture characteristics; to provide such an apparatus and method that will make rupture areas in various types of thermoplastic film including certain types that are not thermally sealable; to provide such an apparatus and method that will produce rupture areas that will assure rupture in the desired area of the flexible container; to provide such an apparatus and method that will produce rupture areas in thermoplastic film at high operating speeds; to provide such an apparatus which includes means to control operating parameters with resultant consistency in rupture strength of the rupture area; and to provide such apparatus that is economical to operate and maintain, safe to use, efficient in operation, and well adapted for its intended purpose.

Other objects and advantages of this invention will become apparent from the following detailed description taken in connection with the accompanying drawings wherein are set forth by way of illustration and example certain embodiments of the present invention.

FIG. 5 is a perspective view of continuous feed type rupture line producing apparatus.

FIG. 6 is an enlarged section view of the mold means taken along the line 6—6, FIG. 5 but showing the mold means in engagement with the plastic film and illustrating certain parts with highly exaggerated thickness.

FIG. 7 is an elevational view of a male portion of the mold means of FIG. 2 but showing a modified ridge pattern.

Figure 1:
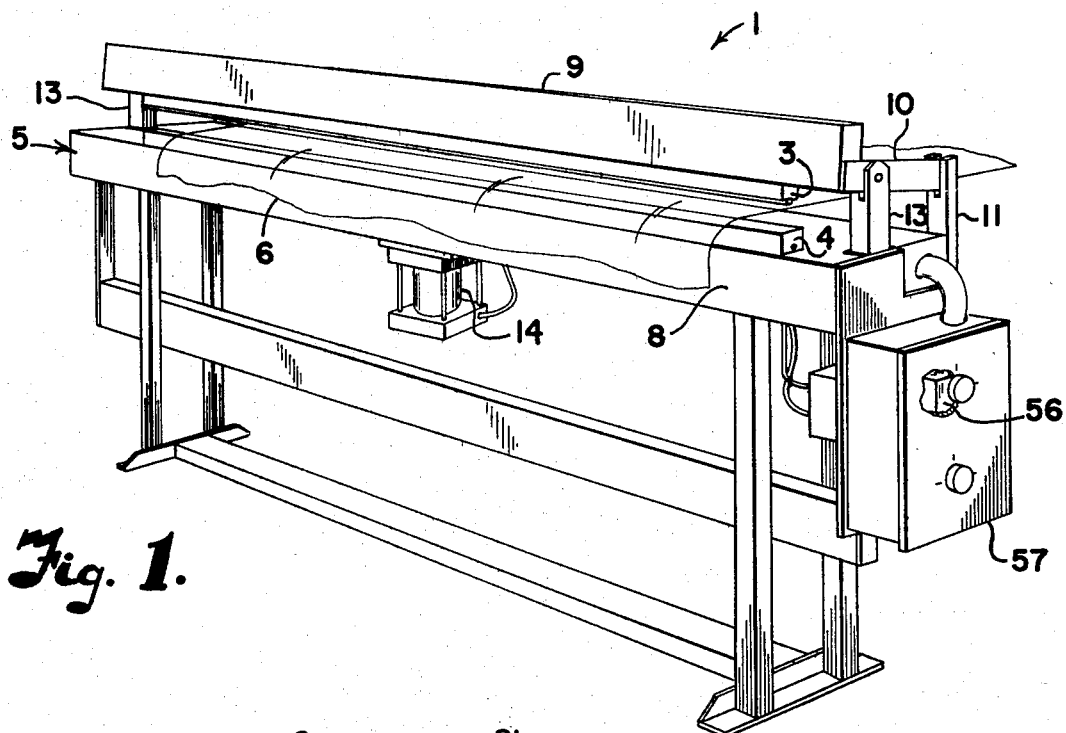
FIG. 1 is a perspective view of rupture line producing apparatus embodying this invention of the sequential feed type and having a straight male mold ridge pattern.

Referring more in detail to the drawings:

The reference numeral 1 designates generally an apparatus for producing rupture or weakened areas in plastic film. The apparatus 1 includes a mold means comprised of a male mold portion 3 and a female mold portion 4 mounted on a frame structure 5 wherein the mold portions 3 and 4 are movable toward and away from each other and thermoplastic film 6 is interposed therebetween. Heating means, described below, are in heat transfer relation with at least one of the male portion 3 and female portion 4 whereby both heat and force may be applied to the thermoplastic film 6 to form a decreased thickness area or impression, producing a weakend or rupture line therein. Preferably the thermoplastic film 6 is in the form of an elongate sheet intermittently fed between the male portion 3 and the female portion 4.

In the illustrated structure, the male portion 3 and the female portion 4 are elongate members positioned in substantially parallel relation along the length thereof. The female portion 4 is mounted on a table 8 formed by the frame 5 and the male portion 3 is mounted on an elongate brace 9 that is positioned above the table 8. Preferably, the brace 9 is movable relative to the table 8 and has arms 10 secured to each end thereof which are pivotally mounted on upstanding supports 11 that are secured to the table 8. A link 13 is secured to each of the arms 10 and is operatively connected to a force applying device such as an air cylinder 14 that is operable on command so as to move the male portion 3 and the female portion 4 into engagement with opposite surfaces 16 and 17 of the film 6, FIG. 2. The male portion 3 and the female portion 4 have a male mold surface 12 and female mold surface 15 and cooperate to apply force and heat to the plastic film in selected areas thereby causing portions of the plastic film 6 to extrude and produce an impression or a decreased thickness area in the plastic film 6. Preferably the surfaces 12 and 15 have anit-stick qualities preventing adhesion of the plastic film 6 thereto.

In the form illustrated, the male poriton 3 is comprised of a resilient member 20 that is suitably secured to the brace 9 such as by a channel member 21 that has flange portions 22 that grippingly engage side portions of the resilient member 20. The resilient member 20 has a lower surface 24 with a protuberance or rib 25 thereon forming the surface 12 which is engageable with the surface 16 of the plastic film 6. The rib 25 may be one of various forms or shapes and as illustrated comprises a wire 26 having a resilient coating 27 of material thereon such as Teflon. Preferably the rib 25 extends the length of the resilient member 20 and has opposite ends thereof secured to means such as capstans (not shown) that are suitably secured to the brace member 9 and hold the rib 25 in engagement with the resilient member 20, maintaining tension in the wire 26. It is to be noted that selected areas along the resilient member 20 may be absent of the rib 25 for a purpose later described.

The female portion 4 is suitably mounted on the table 8 wherein the surface 15 is positioned adjacent and substantially parallel to the surface 12. In the illustrated structure, the female portion 4 is comprised of a base member 30 that is mounted on the table 8 and has an upper surface 31 that is covered by a layer of material 32 such as Teflon impregnated fiberglass. Preferably the female portion 4 is provided with heating means and as illustrated a heating element 34 overlies a portion of the layer of material 32 and extends substantially the length of the base member 30. The heating element 34 preferably is an electrical resistance type heater such as hard nichrome and is connected to an electric power supply (not shown) by electrical conductors 33 and the material 32 is an electrical insulator. The heating element 34 extends along the length of the base member 30 and is suitably held in position on the layer of material 32.

Figure 3:
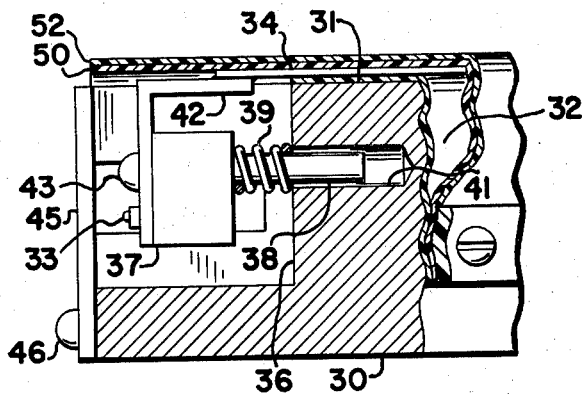
FIG. 3 is an enlarged fragmentary view including the mold means of FIG. 2, with portions broken away to show structural details at one end thereof.

Preferably, the heating element 34 is maintained in a tensioned condition to prevent buckling or warpage when expanding and contracting due to changes in temperature. As illustrated in FIG. 3, the base member 30 has a notch 36 at each end thereof for receiving a spring loaded tensioning block 37 therein. The block 37 has a pin 38 extending therefrom surrounded by a spring member 39. The pin 38 extends into a bore 41 in the base member 30 wherein the spring 39 is positioned between the block 37 and a surface of the notch 36. The heater 34 has brackets 42 secured to each end thereof with each of the brackets being suitably secured to a respective block member 37 such as with screw fasteners 43. Preferably the blocks 37 are of an electrically non-conductive material thereby preventing conduction of electricity from the heating element 34 to the base member 30. The block members 37 are retained in the notches 36 by abutment forming members 45 that are each secured to a respective end of the base member 30 thereby maintaining tension in the heater 34 and compensating for expansion and contraction thereof due to temperature changes.

A layer 50 of resilient material such as teflon impregnated fiberglass is secured to the base member 30 and overlies the heater 34, providing electrical insulation for the heater 34 and a resilient covering. Preferably a second layer 52 overlies and is secured to the layer 50 and is of a resilient material such as Teflon impregnated fiberglass and is self-adhering for securing same to the layer 50. The layer 52 provides a thicker resilient covering over the heater 34 and because of its adhesive engagement it is easily replaceable when it becomes worn. The layers 32, 50, and 52, the heater 34 and the plastic film 6 are each in the order of 0.005 inch to 0.010 inch in thickness but are highly exaggerated in the drawings for clarity.

Figure 8:
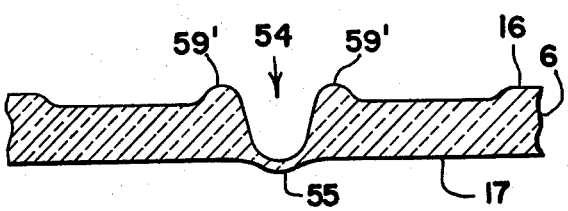
FIG. 8 is a section view of the rupture area in the plastic film with the vertical dimension highly exaggerated.

In operation, the plastic film 6 is interposed between the surfaces 12 and 15 and pressurized air is supplied to the cylinder 14, moving the surfaces 12 and 15 into engagement with the surfaces 16 and 17 respectively. Heat supplied by the heater 34 is transferred through the layers 50 and 52 to the plastic film 6 and the force applied causes the plastic film 6 to extrude forming an impression or reduced thickness line or area 54 as is best seen in FIG. 8 in which the thickness of the plastic film 6 is highly exaggerated. The force applied by the surface 12 produces resilient or elastic deformation in the layers 50 and 52 whereby they conform generally in shape to the rib 25, producing a portion 55 in the film 6 which protrudes slightly outwardly from the surface 17.

It is to be noted that the lower surface 24 and the rib 25 may be one of various shapes or contours and as illustrated the rib 25 has a generally round cross section and the lower surface 24 is nonplanar and has grooves 59 on opposite sides of the rib 25. The grooves 59 form ridges 50' that are seen as sharp edge terminations of the weakened area 54 on opposite sides of the portion 55 when viewed in actual size, but when enlarged as illustrated in the example of FIG. 8, are seen to have contoured lateral surfaces smoothly blending into the portion 55 which forms a web integral with the film 6. Preferably the heat supplied by the heater 34 is produced by a current pulse of controlled duration and is controlled by suitable pulse forming means 56. Such pulse is desirably supplied during the period of time when the surfaces 12 and 15 are in contact with the plastic film 6. Before the male portion 3 is moved to a non-engaging position the heater is deactivated so as to allow cooling of the plastic film 6. To speed up the cooling process a channel 51 can be provided in the base member 30 whereby coolant 53 in the channel 51 acts as a heat sink for rapid cooling of the surface 15. A control unit 57 has suitable control devices (not shown) mounted therein and operable to control the temperature of the heating element 34, the duration of time that the male member 3 is in engagement with the film 6 and the force applied to the film 6. Adjustment of these control devices will determine the thickness of the film 6 at the impression 54 and consequently the amount of force required to rupture the plastic film 6 at the weakened line area 54.

Figure 2:
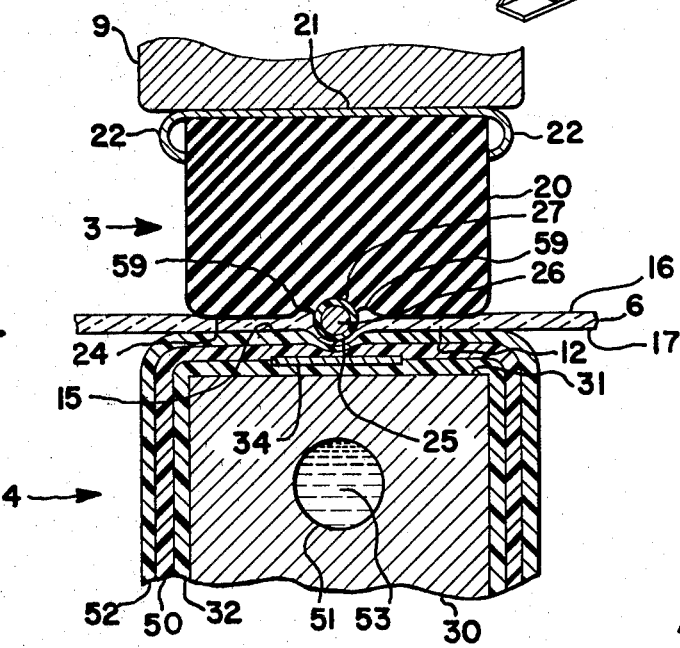
FIG. 2 is an enlarged sectional view taken on the lines 2—2, FIG. 1, but showing mold means in engagement with plastic film and illustrating certain parts with highly exaggerated thicknesses.
Figure 4:
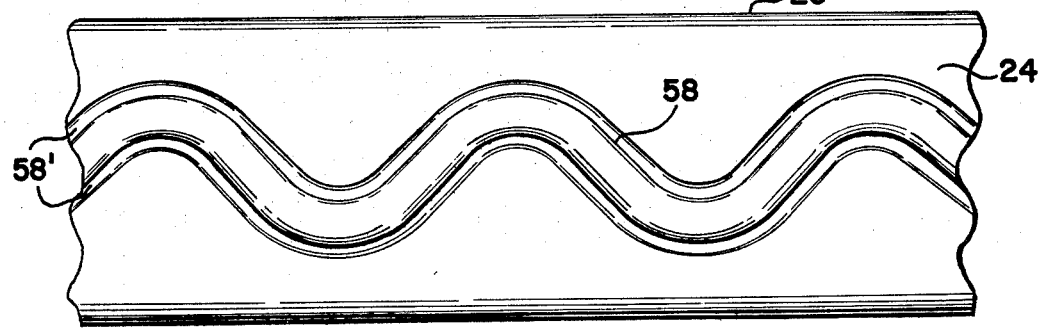
FIG. 4 is a bottom view of a male portion of the mold means of FIG. 2 but showing a modified ridge pattern.

Although the rib 25 discussed in connection with FIGS. 1 and 2 is straight, it is to be noted that the rib can be one of several different configurations with a preferred configuration being illustrated in FIG. 4. The structure as illustrated in FIG. 4 includes a generally sinusoidal shaped rib 58 having grooves 58' on opposite sides thereof similar to the grooves 59, that will produce a corresponding shape of weakened line or area in the plastic film 6. Also, portions of the rib 25 may be eliminated for producing alternating weakened and strong areas along the plastic film 6.

FIGS. 5, 6, and 7 illustrate a modified form of the present invention wherein the reference numeral 60 designates generally an apparatus for producing the rupture lines or areas in plastic film continuously by use of a roller rather than in sequential steps. The apparatus 60 includes a mold means comprised of a cylindrical male mold portion 62 and a stationary female mold portion 63 mounted on a frame structure 64 for selective pressure engagement together and having thermoplastic film interposed therebetween. The male portion 62 is rotatable and the female portion 63 has low friction characteristics whereby the plastic film 6 can be continuously fed therebetween. Heating means are in heat transfer relation to at least one of the male portion 62 and the female portion 63 whereby heat and force may be applied to the film 6 to form the decreased thickness area or impression in the thermoplastic film discussed above.

In the illustrated structure, the male portion 62 and the female portion 63 are mounted on a table member 66 formed by a frame structure 64, preferably with the portion 62 being positioned above the portion 63. The portion 62, in the form shown, includes a roller member 67 mounted on a shaft 68 that is suitable driven by power means 69, such as an electric motor that is operatively connected to the shaft 68. The roller member 67 and the shaft 68 are selectively movable toward and away from the portion 63 and has means associated therewith for applying a selected force to the plastic film 6. As illustrated, air cylinders 70 are connected to the shaft 68 at opposite ends thereof and are operable on command to raise and lower the male portion 62 relative to the female portion 63 and by regulation of the air pressure to the cylinders 70, the amount of force between the male portion 62 and the female portion 63 can be adjusted. The shaft 68 has the opposite ends thereof rotatably mounted in bearing members 71 that in turn are suitably movably mounted in generally upright support members 72. The roller member 67 is provided with a protuberance or rib 73 projecting radially outwardly of the roller member 67, preferably having grooves 73' on opposite sides thereof to form the ridges 59'. The rib 73 engages the plastic film 6 and urges the plastic film 6 to extrude away from same under the influence of heat and force as previously described. Preferably, the roller member 67 and the rib 73 have anti-stick qualities to prevent adhesion with the plastic film 6.

The female portion 63 is similar in construction and operation to the female portion 4 wherein the heating means includes an electrical resistance heater 74 supported by a base member 75 that is secured to the table 66. A layer 76 of electrically non-conductive material, such as Teflon impregnated fiberglass, is secured to the base member 75 and is positioned between same and the heater 74 thereby electrically insulating the heater 74 from the base member 75. One or more layers of material, such as Teflon impregnated fiberglass, overlie the heater 74 providing a resilient covering therefor. The layers 77 and 78 are suitably secured to the base member 75 and preferably the layer 77 has a self-adhering surface that adheres to the layer 78. The surface 79 of the layer 77 that engages the plastic film 6 has anti-stick qualities for preventing adhesion to the plastic film 6. The ends of the female portion 63 have sloping portions to facilitate movement of the plastic film 6 thereover. The heater 74 is maintained in a tensioned condition in a method similar the heater 34 discussed above.

In the illustrated structure, the roller member 67 has an outer periphery or surface 80 with the rib 73 extending outwardly therefrom. It is to be noted that the rib 73 may be one of various forms and as illustrated in FIG. 6, is an annular rib or ring extending circumferentially around the roller 67. FIG. 7 illustrates a modified form of roller rib or protuberance designated 81 which is in a sinusoidal shape that extends circumferentially around the roller 67 and has grooves 81' on opposite side thereof similar to the grooves 73'. Also, if desired, portions of the ribs 73 and 81 may be eliminated so as to form alternating strong areas and weak areas in the plastic film 6.

In operation the plastic film is fed between the male portion 62 and the female portion 63 and is moved therebetween by rotation of the male portion 62. Guide means, such as a roller 82 having collars 83 mounted thereon can be positioned upstream of the mold means guiding the plastic film 6 to the mold means. The male portion 62 is raised by actuation of the cylinders 70 to facilitate interposing plastic film 6 between the male portion 62 and the female portion 63. Driving or pulling means such as power driven rollers 90 are provided to engage the plastic film 6 to help in inducing movement of the plastic film 6 between the male portion 62 and the female portion 63. The speed of the rollers 90 is synchronized to the speed of the male portion 63 and can be driven by the motor 69. Preferably heat is continuously supplied to the film 6 by the heater 74 and the cooperation of the force supplied by the male portion 62 and the heat supplied by the heater 74 produce a weakened or rupture area in the film 6 by the plastic extruding away from the rib 73. Preferably the temperature of the heater 74, the force applied by the male portion 62 and the operating speed are adjustable by control means mounted in a control panel 84.

Figure 9:
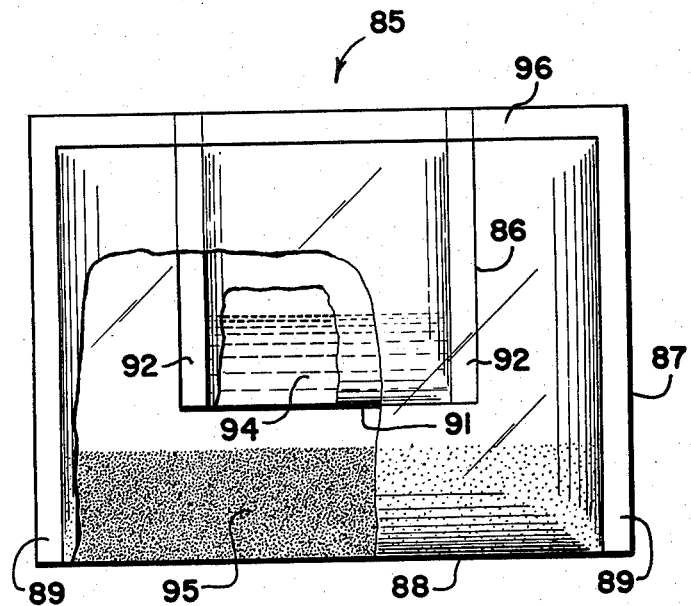
FIG. 9 is an elevational view of a multi-compartment package.
Figure 10:
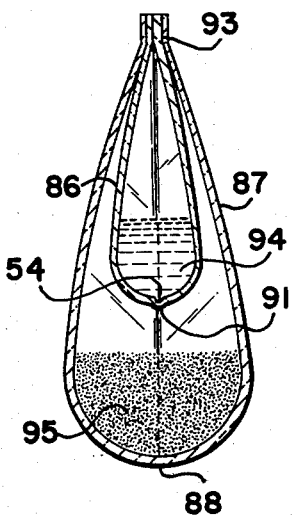
FIG. 10 is a section view of the multi compartment package taken along the line 10—10, FIG. 9.

FIGS. 9 and 10 illustrate a multi-compartment package designated generally by the reference numeral 85 comprised of an inner container 86 and an outer container 87. The outer container 87 is formed by folding a sheet of plastic film as at 88 and heat sealing portions of the opposite sides as at 89. The inner container 86 is fabricated using the plastic film 6 having the weakened area 54 positioned as at 91 and having the opposite sides 92 and the side 93 each sealed, such as by heat sealing, for enclosing the contents 94 therein in a sealed or closed package. Materials 95 are placed in the container 87 and then the package 86 is placed in the package 87 and as illustrated, is heat-sealed between opposite layers of the package 87 as at 96, thereby forming a multi-compartment package having two materials contained therein isolated from one another. Such packages are useful for containing materials such as adhesives, food substances and the like which are not to be mixed until used. To mix the contents 94 and 95 of the packages 86 and 87 respectively, force is applied to the package 86 from the exterior of the package 87 thereby causing the package 86 to rupture along the rupture line or area 54 due to increased pressure in the package 86.

It is to be understood that while I have illustrated and described certain forms of my invention, it is not to be limited to the specific forms or arrangement of parts herein described and shown except insofar as such limitations are included in the following claims.

What I claim and desire to secure by Letters Patent is:
1. A container comprising:
  (a) a pressure rupturable sealed bag containing material and constructed of a flexible thermoplastic sheet film wall having an upper surface and a lower surface, said bag having a heat sealed side;
  (b) a rupture line extending a substantial distance along an integral extent of said sheet film wall and to said heat sealed side, said rupture line being characterized as an elongated groove having contoured lateral surfaces smoothly blending into said upper surface and into a web portion integral with said sheet film wall, said web portion having a cross-sectional thickness substantially reduced and weakened in tensile strength from that of the non-groove portions of said sheet film wall and protruding outwardly from said lower surface, said web portion providing a resistance against rupture less than the non-groove portions of said sheet film wall,
  (c) whereby application of a predetermined internal pressure to said container will cause the container to rupture along said rupture line for release of the material therein.
2. The container as set forth in claim 1 wherein:
  (a) said bag has opposite heat sealed sides and said rupture line extends to said opposite heat sealed sides.

3. The container as set forth in claim 1 wherein:
(a) said rupture line includes ridges protruding form said upper surface and smoothly blending thereinto.

4. In a flexible container:
(a) a bag having a wall of flexible thermoplastic sheet film and opposite heat sealed sides;
(b) a rupture line in said wall and extending to said opposite sides, said rupture line comprising an elongated groove having contoured lateral surfaces smoothly blending into one surface of said sheet film wall and into a web portion integral with said sheet film wall, said web portion being of cross-sectional thickness substantially less than and weakened in tensile strength from the non-groove portions of said sheet film wall and protruding outwardly from one surface of said sheet film wall and providing a resistance against internal pressure produced rupture less than the non-groove portions of said sheet film wall.

* * * * *